Dec. 27, 1927.
R. L. HOWIE
ROTARY PIPE COUPLING
Filed June 7, 1926
1,653,708
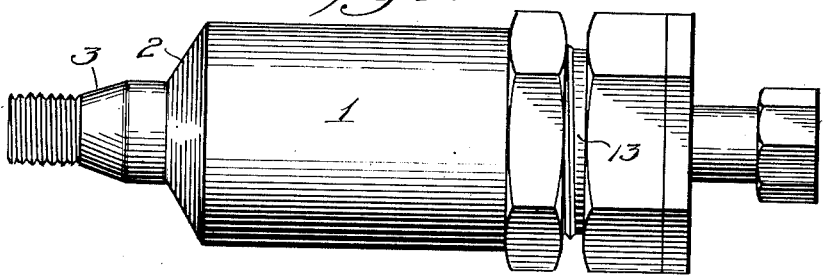
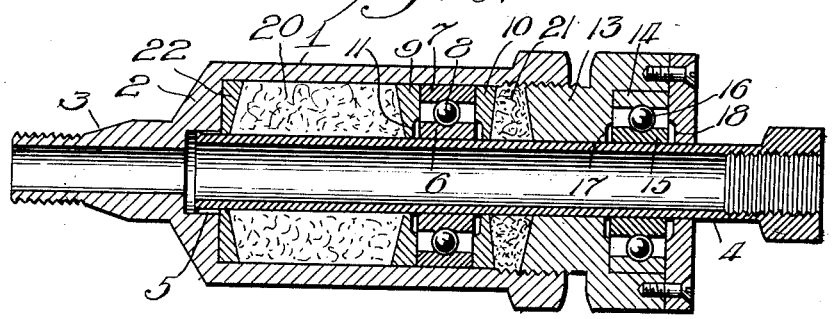
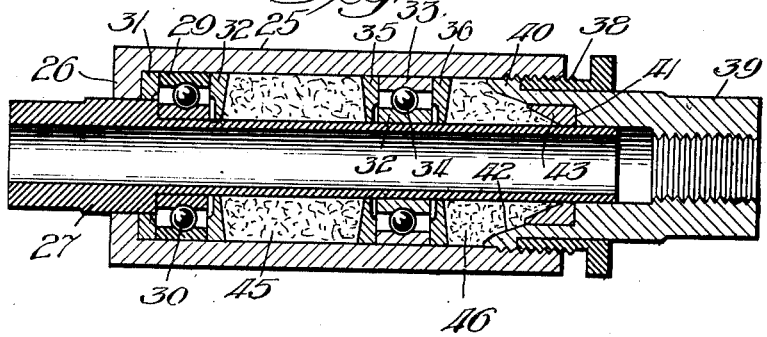
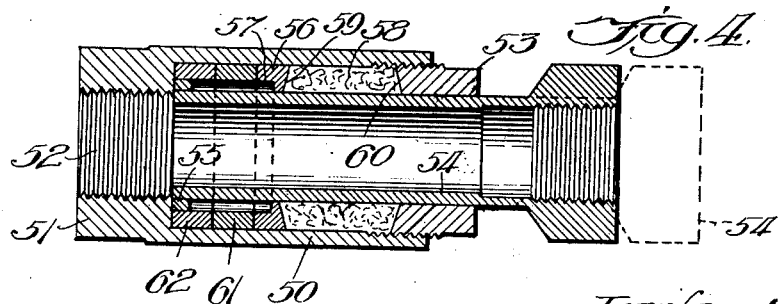
Inventor:
Robert L. Howie,
By Wm. F. Freudenreich,
Atty.

Patented Dec. 27, 1927.

1,653,708

UNITED STATES PATENT OFFICE.

ROBERT L. HOWIE, OF CHICAGO, ILLINOIS.

ROTARY-PIPE COUPLING.

Application filed June 7, 1926. Serial No. 114,134.

The object of the present invention is to produce an effectively packed joint between two pipes or conduits that will permit the latter to rotate freely relatively to each other without leakage at the joint when fluids under high pressure are passing through the pipes are conduits.

Viewed in another of its aspects, the object of the present invention may be said to be the production of a union or connection between two pipes or conduits, required to rotate relatively to each other, whereby the joint between the pipes or conduits is effectively sealed against leakage at high pressures; the bearings in which the rotation takes place are relieved of all stresses except those imposed by the conduit of supporting a rotatable element; and the relative rotation between the pipes or conduits takes place without meeting any appreciable resistance.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a coupling or union arranged in accordance with the present invention; Fig. 2 is a central longitudinal section through the device shown in Fig. 1; Fig. 3 is a central longitudinal section through a modified form or union or coupling; and Fig. 4 is a central longitudinal section through a still further modified form of coupling, illustrating in dotted lines the possible displacement of one of the elements, whereby the device serves the additional purpose of an expansion joint.

Referring to Figures 1 and 2 of the drawing, 1 represents a barrel having a cylindrical bore, the barrel being open at one end and having at the other end a head 2 provided with a central nipple 3 the passage through which communicates with the space within the barrel. The nipple constitutes one of two relatively rotatable members, the other of which is a tube 4 of smaller diameter than the interior of the barrel extending axially of the barrel through the open end of the latter. The inner side of the head 2 is preferably recessed at the center, as indicated at 5, to receive the inner end of the tube.

Within the barrel, and surrounding the tube, is an anti-friction bearing which, in the arrangement shown, comprises an annular race 6 fixed to the barrel, a second annular race 7 surrounding and concentric with the race 6 and having an easy fit within the barrel, together with balls 8 or other antifriction devices arranged between the races.

On opposite sides of the anti-friction bearing are placed two followers 9 and 10 in the form of washers. Each follower has a central recess 11 on the side directed toward the bearing; this recess being of slightly larger diameter than the diameter of the inner race 6. Consequently the followers may abut against the side faces of the outer race, but stand clear of the inner race so as not to interfere with the free rotation of the latter.

Into the open end of the barrel is screwed a plug 13 through which the tube 4 passes. Within this plug is an antifriction bearing similar to the one just described; the outer race 14 being stationary with respect to the plug, while the inner race 15 simply has a bearing fit on the tube. Between the races 14 and 15 are balls 16 or other antifriction devices. This second bearing is arranged in a pocket in the plug, this pocket being enlarged at the center, as indicated at 17 and 18, to form clearing spaces at opposite sides of the inner race.

Surrounding the tube between the follower 9 and the head 2 is a suitable packing 20, and there is also a body of packing 21 between the follower 10 and the inner end of the plug 13. For convenience, there may be a washer-like follower 22 on the inner end of the tube, this follower lying against the head, so that the packing engages with the follower instead of directly with the head. The faces of the followers in engagement with the packing, and the inner face of the plug are preferably dished so that when the parts are assembled as shown, and the plug screwed tight, the packing is pressed in the lengthwise direction and also into snug contact with the tube. The parts are so proportioned that when they are assembled the tube does not bottom in the recess 5. Therefore, when the plug is tightened, the tube with the entire central bearing is moved inward bodily as the packing is compressed; but, since the forces for compressing the packing are transmitted through the follower 10 and the outer race 7, no longitudinal stresses are placed on the tube. The result is that after the parts have been assembled and the plug tightened so as securely to pack the joint, the tube may rotate within the barrel or the barrel rotate about the tube without the necessity of overcoming any other resistance than the friction between the packing and the tube. Such relative rotation soon produces a perfect bearing fit between the tube and the packing, so that the tube and the barrel may rotate relatively to each other freely and without encountering any material resistance. It will be seen that the two antifriction bearings hold the tube and the barrel positively in coaxial relation to each other, so that there can be no whipping of the tube in the barrel and a consequent enlarging of the bore in the packing, so that after a bearing fit has been established between the tube and the packing, the same is maintained indefinitely. As a result of my peculiar construction, I am enabled to rotate the tubes and the barrels at a very high relative speed while fluids under high pressure are passing through the same, without leakage in the coupling or connection.

In the arrangement shown in Fig. 3, there is a barrel 25 having at one end a head 26 and open at the other end. A tube 27 passes into the barrel through the open end. Between the tube and the barrel, adjacent to the head 26, is a bearing consisting of an inner annular race fixed to the tube, an outer annular race 29 having a bearing fit within the barrel, and antifriction devices 30 between the races. On opposite sides of this bearing are followers 31 and 32 similar to the followers 9 and 10 in the form of my invention previously described. There is a second antifriction bearing arranged within the barrel, this consisting of an inner race 32 and an outer race 33 spaced apart by balls 34 or other antifriction devices, both races being movable relatively to both the barrel and the tube. There are followers 35 and 36, similar to the followers 9 and 10, on opposite sides of this bearing. A plug in the form of a sleeve 38 is screwed into the open end of the barrel through this sleeve, and fitting slidably therein, is a sleeve 39 having on its inner end an enlargement 40 to prevent its withdrawal outwardly through the sleeve 38. The bore in the inner end of the sleeve 39 is made conical. If desired, the sleeve 39 may have a cylindrical pocket 41 at the bottom of the conical portion 42, to receive a follower 43 provided with a conical bore that forms, in effect, a continuation of the conical bore 42. In assembling the parts, the tube is slipped into the open end of the barrel until the follower 31 rests against the head at the closed end of the barrel. A body of packing 45 is then placed in the barrel around the tube, and the second antifriction bearing with its followers is applied. A second body of packing 46 is then applied and the plug with the sleeve 39 assembled therein is then screwed into the open end of the barrel. Upon screwing in the plug, the sleeve 31 is forced inwardly, compressing the two bodies of packing, the intermediate antifriction bearing sliding bodily lengthwise of the barrel and tube as the compression progresses. It will be seen that the compressing forces are transmitted from the packing 46 through the follower 36, race 33 and follower 35 to the packing 45, and thence through the follower 32 and race 29 to the follower 31 and head 26, both of the inner races 32 and 28 being left free so as to meet no resistance when they turn.

The tube 27 is preferably made long enough to extend into and have a bearing in the inner end of the sleeve 39.

The principle of construction and operation of the device illustrated in Fig. 3 is the same as that shown in Figs. 1 and 2. In Fig. 4, however, I have shown an extremely simple form of device that is not adapted for high speed rotation, although it is adapted for high pressures. The simplicity of the device shown in Fig. 4 is such that it may be used in the place of an ordinary union. The device comprises a barrel 50 having at one end a head 51 that may be provided with a screw-threaded central bore 52. Into the open end of the barrel is screwed a plug 53 through which passes a tube 54 smaller in diameter than the internal diameter of the barrel. The tube 54 has an external flange 55 at its inner end to prevent the complete withdrawal of the tube from the plug. Surrounding the inner end of the tube, in front of the flange, is a loose annular follower 56 having in the rear face or side a central pocket 57 large enough in diameter to receive the flange 55 and somewhat deeper than the thickness of this flange, so that if the follower is placed directly against the head of the barrel, the flange will not be clamped between the follower and the head but is left free to rotate. Between the follower 56 and the plug is placed a body 58 of packing. The faces of the follower and the plug directed toward each other are preferably dished, as indicated at 59 and 60. When the parts are assembled and the plug is screwed in, the packing is compressed between the plug and the follower, without placing any longitudinal stresses on the tube. The tube may therefore rotate freely within the barrel, being maintained coaxial with the latter by reason of the bearing in the sleeve and the supporting bearing at the periphery of the flange.

This device may conveniently be made to serve as an expansion joint, by making the follower 56 thick and the pocket 57 deep. Instead of using a single wide or thick follower, it may be made in several sections, one of which consists of the part 56 and the others of simple rings 61 and 62 placed behind the follower, the internal diameter of the rings being the same as the diameter of the pocket 57. The tube is therefore permitted to move lengthwise between the position shown in full lines and that shown in dotted lines.

While I have illustrated and described with particularity only a few preferred forms of my invention, I do not desire to be limited to the exact structural details thus illustrated and described; but intend to cover all forms and arrangements which come within the definitions of my invention constituting the appended claims.

I claim:

1. In combination, a barrel, a tube smaller in diameter than the interior of the barrel extending into and coaxial with the latter, a bearing within the barrel comprising two concentric races surrounding the tube and spaced apart from each other by anti-friction devices, followers surrounding the tube on opposite sides of said bearing, said followers being in contact with the sides of one of said races and standing clear of the other race, packing surrounding the tube adjacent to each follower, and means for compressing said packing against said followers.

2. In combination, a barrel having a long cylindrical bore, a tube considerably smaller in diameter than said bore extending into and coaxial with the latter, a bearing within the barrel comprising two concentric races surrounding the tube and spaced apart from each other by anti-friction devices, followers surrounding the tubes on opposite sides of said bearing, said followers being in contact with the sides of one of the races and standing clear of the other race, one of the races being stationary and the other being movable lengthwise of the barrel, packing surrounding the tube within the barrel beyond each of the followers, said barrel having an abutment engaging with the packing on one side of the bearing, and an adjustable bearing device for the tube engaged with the end of the packing on the opposite side of the bearing, to compress the packing between the same and said abutment.

3. In combination, a barrel, a tube smaller in diameter than the interior of the barrel extending into the same, two bearings for said tube spaced apart lengthwise of the latter, each bearing comprising two concentric races surrounding the tube and spaced apart from each other by anti-friction devices, the inner race of one bearing being fixed to the tube and the inner race of the other bearing being loose on the tube, a packing surrounding said tube, and means for forcing said bearings toward each other to compress the packing.

4. In combination, a chambered device including a barrel and a plug screwed into one end of the barrel, a tube extending into said device, said device having two bearings for the tube spaced apart lengthwise of the tube, each bearing comprising two concentric rings surrounding the tube and spaced apart from each other by anti-friction elements, the outer race of one of said bearings being movable lengthwise of the barrel and the inner race of that bearing being fixed to the barrel, the inner race of the other bearing being slidable on the barrel, and packing arranged around the tube on opposite sides of the bearing whose outer race is movable in the barrel, the packing on one side of the latter race being engaged by the plug whereby the screwing in of the plug compresses all the packing.

In testimony whereof, I sign this specification.

ROBERT L. HOWIE.